Oct. 11, 1927. 1,645,178
A. HALL-BROWN
SUPERCHARGING OF INTERNAL COMBUSTION ENGINES
Filed Oct. 25, 1926
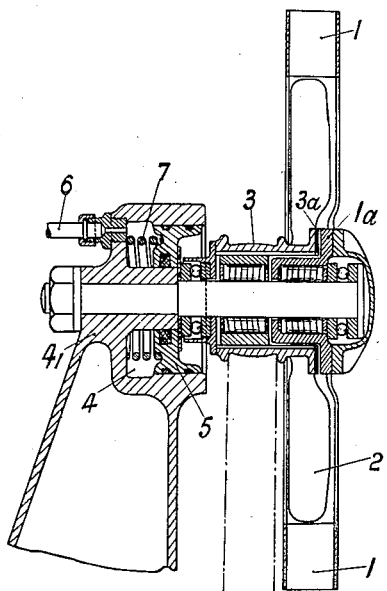
FIG. I.
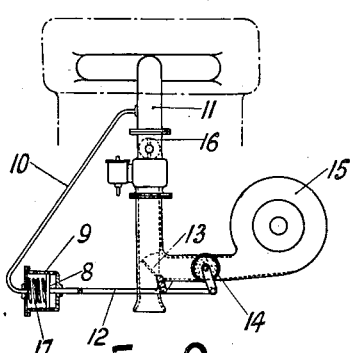
FIG. 2.
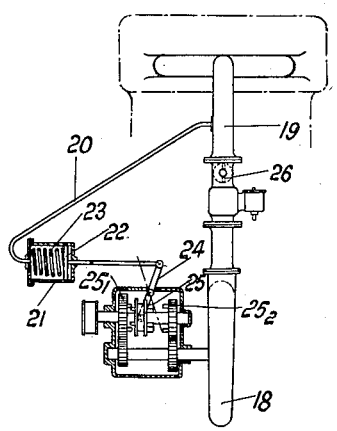
FIG. 3

Patented Oct. 11, 1927.

1,645,178

UNITED STATES PATENT OFFICE.

ARCHIBALD HALL-BROWN, OF SURREY, ENGLAND.

SUPERCHARGING OF INTERNAL-COMBUSTION ENGINES.

Application filed October 25, 1926, Serial No. 143,951, and in Great Britain October 24, 1925.

This invention relates to improvements in and connected with the supercharging of internal combustion engines.

Broadly considered the invention consists in utilizing the suction in the induction pipe to initiate and interrupt or to control supercharging automatically. In the preferred form of the invention such suction is utilized to initiate supercharging when increased external load has been applied to the engine, and to interrupt supercharging when the external load has been reduced.

It is known that in the normal operation of an internal combustion engine, which draws in the fuel by suction of the piston, there will be—under normal conditions—a suction measurable in a considerable number of inches of water in the induction pipe. As the work done by the engines is increased and the throttle more fully opened the negative pressure in the induction pipe is decreased until, when the engine is operating at maximum load, the negative pressure in the induction pipe tends to approximate to nil, i. e., to become equal to atmospheric pressure.

For example, with a motor vehicle driven by an internal combustion engine, when travelling on a level road with the throttle one quarter open, the negative pressure in the induction pipe is considerable; as the engine is required to do increased work in mounting a gradient and the throttle is more fully opened, the negative pressure decreases until, if gear change is not effected, the engine stalls due to the severity of the gradient. An object of the invention in its preferred form is to cause the supercharger to be brought into action at some point before the pressure in the induction pipe becomes equal to atmospheric pressure, and also to provide for interruption of supercharging when the engine speed is increased due to reduction of load.

The means provided for realizing the last-named object may be used either to operate valves, permitting the air supplied by a supercharger of any type to be delivered through the carburettor, or to atmosphere (in which circumstances the engine would be working under ordinary atmospheric conditions), or to bring into driving engagement with the engine a supercharger of any known type, and to interrupt the drive at predetermined points, or the said means may be employed to operate a double drive or change speed drive for a superheater, so as to provide high pressure and large volume at low engine speeds and by suitable gearing to provide smaller pressure and volume at higher engine speeds.

The invention is illustrated diagrammatically in the accompanying drawings in which Fig. 1 is a section through a supercharger fitted with means in accordance with the invention so arranged as to bring the supercharger into driving engagement with the engine and thus into operation when the negative pressure falls in the induction pipe of the engine, and to interrupt the drive to the supercharger when the negative pressure rises in the induction pipe;

Fig. 2 is a diagram showing a supercharger and its connection with the induction pipe of an engine and fitted with means in accordance with the invention for initiating and interrupting supercharging, the means in this instance controlling the supply of air, while Fig. 3 is a diagrammatic illustration of a supercharger installation in which the means for controlling the supercharging operation is adapted to operate gearing for driving the supercharger at higher or lower speed.

In the embodiment illustrated in Fig. 1, in which the supercharger and ordinary radiator fan runner are located on the same axis, 1 denotes the supercharger, 2 the radiator fan runner and 3 the fan driving pulley. 4 is a cylindrical recess formed in the bracket $4^1$ supporting the fan spindle and 5 a piston movable in the cylindrical recess 4. Rearward of the piston the cylinder is connected by a pipe 6 with the induction pipe (not shown) of the engine. The piston 5 is urged by a spring 7 designed to balance the pressure applied to it by the piston 5 when the cylinder 4 is under a negative pressure existing in the induction pipe with the engine running at normal speed under light load. The piston 5 is connected with the fan driving pulley 3, in such manner that, as the negative pressure in the induction pipe falls due to increased load on the engine, necessitating increased throttle opening, and the spring 7 moves the piston 5 outwardly, the piston moves the driving pulley 3 in a direction to bring friction or other surfaces $3^a$ on an extension of the fan driving pulley 3 into engagement with corresponding surfaces on the hub $1^a$ of the supercharger 1, so as to drive the supercharger. It will be appreciated that should the pressure in the induction pipe be again increased, consequent upon decreased load being applied to the engine, the piston would tend to move in the opposite direction against the action of the spring 7 and the supercharger 1 would no longer be in driving relation with the fan and with the engine.

It is assumed in the above description that the carburettor is disposed between the supercharger and the engine.

In the embodiment illustrated in Fig. 2, a suction-responsive spring-balanced piston 8 is fitted in a cylinder 9 which is connected by a pipe 10 with the induction pipe 11 of the engine. This piston 8 is connected by means of the links 12 with a two-way valve 13 located at the junction of the atmospheric inlet and the supercharger outlet with the induction pipe 11, and with a pressure release valve 14 fitted to the discharge pipe of the supercharger 15. Fig. 2 shows the position with the throttle valve 16 fully open and the supercharger delivering air to the engine.

As the throttle valve 16 is closed, a higher vacuum is created in the induction pipe 11 and hence in the cylinder 9. This higher vacuum causes the piston 8 to move against the spring 17, taking with it the links 12 which operate the two-way valve 13 and the pressure release valve 14, the two-way valve 13 opening the atmospheric intake to the induction pipe and closing the discharge from the supercharger, and also opening the pressure release valve 14.

In the embodiment illustrated in Fig. 3 the numeral 18 indicates the supercharger, 19 the induction pipe, 20 the pipe connecting the supercharging controlling cylinder 21 with the induction pipe, 22 the piston and 23 the balancing spring.

In this construction the piston 22 is used to operate a change speed gear driving the supercharger and so arranged that the supercharger will be driven at a higher speed when the carburettor throttle valve is fully open, i. e., when the engine is working under its maximum load.

The piston 22 is connected by means of levers 24 to the sliding dog 25, which engages the high or low gear pinions $25^1$, $25^2$. When the throttle valve 26 is fully open as shown in Fig. 3, the vacuum in the induction pipe will be low and the spring 23 will move the piston 22 forward, thus engaging the higher gear and driving the supercharger at high speed. As the throttle valve is closed and a vacuum created in the induction pipe, the piston 22 is moved against the action of the spring 23, thereby engaging the lower gear and driving the supercharger at a lower speed.

I claim:—

In a supercharging device for internal combustion engines, an induction pipe, a supercharger for delivering air to said induction pipe, means for driving said supercharger, said means being automatically controlled by a system comprising a cylinder having a connection to said induction pipe, a piston movable in said cylinder and a spring acting on said piston in the opposite direction to suction from said induction pipe, to cause said driving means to bring said supercharger into operation upon increase of manifold pressure above a predetermined value.

In testimony whereof I have signed my name to this specification.

A. HALL-BROWN.